W. HENCKLER.
AUTOMOBILE LOCK.
APPLICATION FILED AUG. 7, 1919.
1,345,672.
Patented July 6, 1920.
2 SHEETS—SHEET 1.
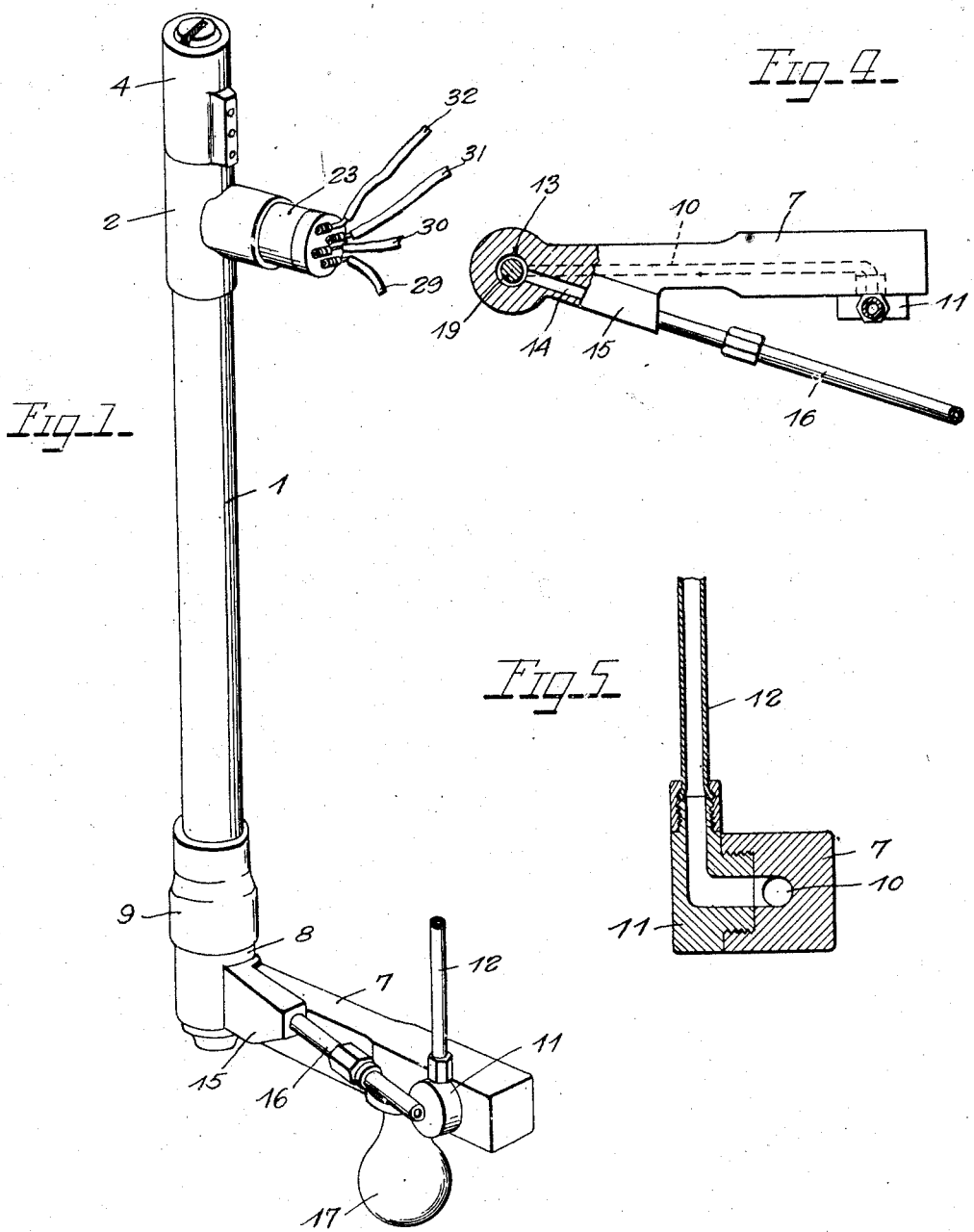
Witness
E. D. Haines.
Inventor
W. Henckler.
By H. B. Willson & Co.
Attorneys

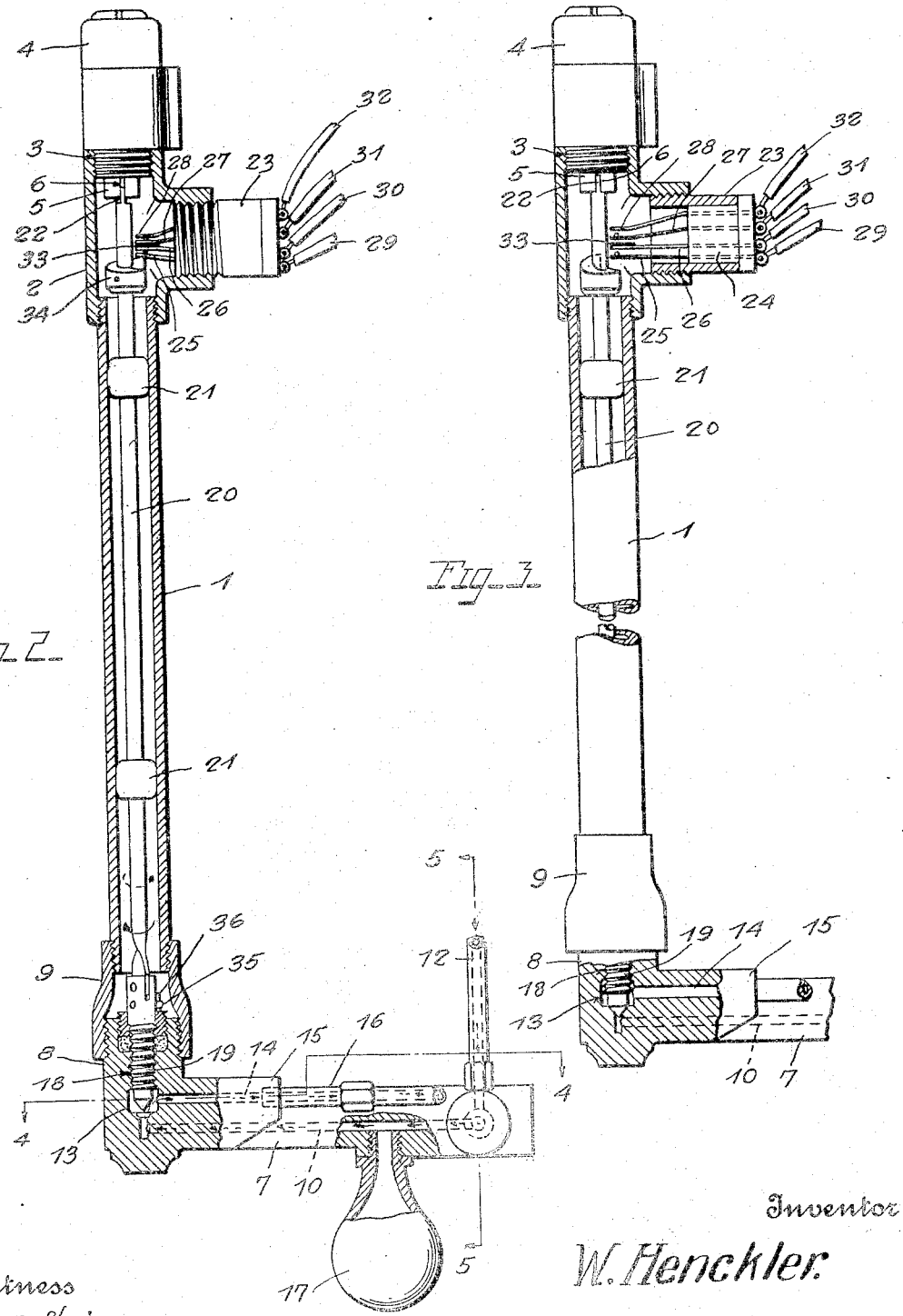

UNITED STATES PATENT OFFICE.

WILLIAM HENCKLER, OF ST. LOUIS, MISSOURI.

AUTOMOBILE-LOCK.

1,345,672.   Specification of Letters Patent.   Patented July 6, 1920.

Application filed August 7, 1919. Serial No. 315,951.

*To all whom it may concern:*

Be it known that I, WILLIAM HENCKLER, a citizen of the United States, residing at St. Louis, State of Missouri, have invented certain new and useful Improvements in Automobile-Locks; and I do declare the following to be a full, clear, and exact description of the invention, such as will enable others skilled in the art to which it appertains to make and use the same.

This invention relates generally to automobile accessories, but more particularly to automobile locks.

The principal object of the invention is to provide a means whereby a valve disposed in the pipe leading from the automobile tank to the carbureter of the engine may be locked in closed position, and one or two electric switches arranged in the circuits in the automobile may be simultaneously locked in opened position, so that the machine can not be started by any person not having a key to the lock.

The lock is of such construction that it may be easily connected to the various parts of the automobile and positioned so as to be readily accessible. The parts of the device are made sufficiently strong and connected together in such a manner that the device can not be easily dismantled by unauthorized persons.

A further object of the invention is to generally improve upon devices of this nature by the provision of a simple, strong, durable and inexpensive construction, one which will be sufficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate corresponding parts throughout the several views, Figure 1 is a perspective view of a device constructed in accordance with this invention;

Fig. 2 is a central longitudinal sectional view through the device, the fuel passage controlling valve being shown in opened position and the electric switches being consequently in closed position;

Fig. 3 is a similar view, partly in section, of the device showing the valve in closed position and the switches in opened position;

Fig. 4 is a detail sectional view taken substantially on the line 4—4 of Fig. 2; and, Fig. 5 is a sectional view taken on a plane indicated by the line 5—5 of Fig. 2.

The device comprises a substantially L-shaped casing, the long arm of which consists mainly of a tube or section of pipe 1 carrying at its upper end an ordinary T-coupling 2, the pipe 1 being threaded into one of the longitudinally alined nipples of the coupling. The other one of the longitudinally alined nipples of the coupling receives a threaded portion 3 of a lock mechanism 4. This lock mechanism is preferably of the pin tumbler type and consequently has a rotatable key plug 5, the inner end of which is provided with a transversely extending slot 6.

The short arm of the casing is in the form of a casting or block 7 having a laterally extending nipple 8 at one end which receives a coupling 9 whereby it is connected to the other end of the tube or pipe 1. Extending longitudinally through the casting or block 7 is a passage way 10 which communicates at one end thereof with a plug 11 threaded or turnably mounted upon the block so as to be adjustable angularly with respect to the same. The plug 11 has connection with a pipe 12 which leads from the fuel tank of the automobile. At its other end the passage 10 communicates with a chamber 13 having valve seat therein. Chamber 13 in turn communicates with a passage 14 extending through an angular portion 15 of the casting, and to this portion 15 is connected a pipe 16 which leads to the carbureter of the automobile engine. To catch the particles of dirt contained in the fuel before the same passes to the carbureter of the engine, a trap 17 is threaded or otherwise suitably attached to a casting 7; this trap having its hollow chamber communicating with the adjacent passage 10.

The nipple 8 of the casting 7 has a longitudinally extending threaded opening 18 adapted to receive a threaded valve 19 therein, said valve being seated upon the seat arranged in the chamber 13 when in closed position. Connected to that portion of the stem of the valve which is disposed outside of the nipple 8 is one end of a rod 20. This rod 20 is both slidably and turnably mounted in the tube 7, being guided by blocks 21, and has a flat portion 22 and its other end which is received in the notch disposed in the key plug of the lock mechanism. The rod 20 is thus connected to the key plug of the lock mechanism so as to be turned by the same, but it can be moved longitudinally without becoming disengaged. As the drawings clearly show the valve 19, the rod 20 and the key plug 5 are disposed in longitudinal alinement. The rod 20 is in reality a part of the stem of the valve.

The remaining nipple of the T-coupling 2 receives a plug 23, the central portion 24 of which is made of insulating material and has extending longitudinally therethrough metallic spring contact fingers 25, 26, 27 and 28 which are normally out of engagement with one another. The fingers 25 and 26 form a switch for the circuit through the spark plugs of the automobile engine, being connected at their outer ends to the wires 29 and 30 of this circuit. The fingers 27 and 28 form a switch for the circuit through the electric starter of the automobile and these are similarly connected to wires 31 and 32. The finger 26 carries a small piece of insulation 33 which prevents said finger from electrically contacting with the finger 27 when the switches are closed in the manner to be described. Fixed upon or carried by the rod 20 is a cam 34, the latter being positioned for engagement with the finger 25 so as to force the same into contact with the finger 26 which in turn bears against the finger 27 to force the latter into contact with the finger 28.

The rod 20 and valve 19 have a limited turning movement, this being effected by the engagement of a pin 35 extending transversely from the valve stem with a pin 36 extending longitudinally from the nipple 8.

When the automobile engine is running valve 19 must necessarily be open and the circuit through the spark plugs must be closed. When the machine is brought to rest and it is desired to lock the valve 19 in closed position and the switches in open position, an appropriate key is inserted in the end of the key plug 5 and turned. The turning of the plug 5 turns the rod 20 and the valve 19 which being threaded in the casing moves longitudinally and against its seat. The longitudinal movement of the valve causes a similar movement of the rod 20 and this together with a turning movement of the rod moves the cam 34 out of engagement with the finger 25. Pressure being thus taken off of the finger 25 allows it to spring out of contact with the finger 26 and a similar disengagement will take place between the fingers 27 and 28.

The threaded joints between the various parts of the casing may be upset or soldered or cemented so as to prevent it from being easily dismantled by unauthorized persons, and the casing is made sufficiently thick or strong to prevent it from being cut or broken without the aid of handy tools. The device will thus lock the automobile engine at rest and only the person having the appropriate key can unlock it and start the engine.

From the foregoing description taken in connection with the accompanying drawings the construction, use and operation of the device will be readily understood.

Various changes in form, proportion, and in the minor details of construction may be resorted to without departing from the spirit of the invention as defined in the claims.

What is claimed is:—

1. A valve and switch actuating mechanism comprising an open ended tubular casing, a valve housing connected with one end of the casing, a head at the opposite end of the casing, an actuating rod rotatably and slidably mounted in the casing, a valve member connected with the rod and threaded into the valve housing for movement into and out of a closed position, a cam element carried upon the rod within the head, a circuit terminal having contact elements extending into the head for engagement by said cam to move the contacts into engagement with each other when the rod is turned to move the valve to an open position, and a lock controlled turning element carried by the head and having sliding engagement with the rod.

2. A device of the class described comprising a casing having a fuel passage therein, a rod turnably and slidably mounted in said casing, a lock mechanism mounted in said casing and having a turnable key plug in longitudinal alinement with said rod and loosely connected with one end thereof so as to turn the same but allow said rod to move longitudinally, a valve for controlling said passage threaded in said casing, said valve being longitudinally alined with said rod and connected to the other end thereof so as to move the latter longitudinally when turned, an electric switch mounted in said casing, and a cam carried by said rod and positioned for engagement with said switch to operate the latter.

3. A device of the class described comprising a substantially L-shaped casing having a longitudinally extending fuel passage in its short arm, a rod turnably and slidably mounted in the long arm of said casing, a lock mechanism carried by the long arm of said casing, and having a turnable key plug longitudinally alined with and loosely connected to one end of said rod so as to turn the latter but permitting said rod to move longitudinally, a valve controlling said passage threaded in said casing, said valve being longitudinally alined with said rod and connected to the other end thereof so as to move said rod longitudinally when turned, a pair of spring contact fingers disposed in the long arm of said casing, and a cam carried by said rod and positioned for engagement with one of said fingers to move it into engagement with the other finger when said rod is turned by the turning of said key plug and moved longitudinally as said valve is turned.

In testimony whereof I have hereunto set my hand.

WILLIAM HENCKLER.